R. HERMAN.
POWER TRANSMITTING MECHANISM.
APPLICATION FILED MAY 27, 1908. RENEWED JULY 5, 1910.

983,444.

Patented Feb. 7, 1911.
4 SHEETS—SHEET 1.

R. HERMAN.
POWER TRANSMITTING MECHANISM.
APPLICATION FILED MAY 27, 1908. RENEWED JULY 5, 1910.

983,444.

Patented Feb. 7, 1911.

WITNESSES:
Wm F Hoyle
M. E. Lowry

INVENTOR
R. Herman
BY
H. C. Evert & Co
Attorneys

UNITED STATES PATENT OFFICE.

REINHOLD HERMAN, OF CRAFTON, PENNSYLVANIA.

POWER-TRANSMITTING MECHANISM.

983,444.  Specification of Letters Patent.  Patented Feb. 7, 1911.

Application filed May 27, 1908, Serial No. 435,230. Renewed July 5, 1910. Serial No. 570,393.

*To all whom it may concern:*

Be it known that I, REINHOLD HERMAN, a citizen of the United States of America, residing at Crafton, in the county of Allegheny and State of Pennsylvania, have invented certain new and useful Improvements in Power-Transmitting Mechanism, of which the following is a specification, reference being had therein to the accompanying drawing.

My invention relates to improvements in power transmission, and has particular relation to devices for changing the speed or direction of rotation of a driven shaft.

The particular objects of my invention are—First. To provide a structure in which the driving and driven shafts are operatively connected together in a manner to provide various changes in speed and direction of movement of the driven shaft by means of a gear transmission mechanism movable axially with respect to the shafts and free of shaft support. Second. To provide a gear transmission mechanism in which the shafts are substantially free from gear strains. Third. To provide a structure in which the gears coöperating with the driven shaft to provide the changes in speed and direction of rotation are movable as a unitary structure with respect to said shaft. Fourth. To provide a structure in which the gears coöperating with the driven shaft to produce the changes in speed and direction of rotation are arranged in a plurality of pairs fixedly positioned relatively to each other and having common axes, the operative connection of the pairs and driven shaft being confined to a single pair of any of the pairs. Fifth. To provide a structure in which the pairs of gears coöperating with the driven shaft to produce the changes in speed and direction of rotation are mounted with respect to the shaft in such manner that all of the pairs of gears, with the exception of that pair which is in operative engagement with the shaft will be free from movement. Sixth. To provide a structure in which the gear stress will be confined to each individual set of gears and taken up by their respective bearings, the latter having no connection with the shaft. Seventh. To provide a structure in which the gears are mounted in a carrier or carriers having an axial movement with respect to a casing and shafts, the mounting of the gears within the carriers being so arranged as to cause the strains to be confined to the bearings of the gears and the carrier or carriers. Eighth. To provide a structure in which the engagement of gears and shafts in changing the speed or direction of rotation of the driven shaft from the driving shaft is successive from the drive to the driven shaft, or vice versa during the disengagement of the parts. Ninth. To provide a structure which is compact, durable, easy to manipulate, quickly responsive, and of relative low cost of manufacture.

To these and other ends the nature of which will be readily understood as the invention is hereinafter described, my invention consists in the improved construction and combination of parts hereinafter fully described, illustrated in the accompanying drawings, and particularly pointed out in the appended claims.

In the drawings, in which similar reference characters indicate similar parts in each of the views.

In the drawings, 10 designates a gear casing formed practically of two members 11 and 12, each of which is in the form of a shell having its sides inclined, the latter being formed with flanges 13, said flanges, when the casing is assembled, being removably secured together by suitable means such as bolts or screws 14. The lower member 12 of the casing is formed with a bottom while the upper member 11 is formed with an open top, said members forming a chamber within which is mounted the gear mechanism hereinafter described, the chamber having its greatest width on the plane of the flanges 13, the ends of the chamber being closed by walls formed to provide bearings for the shafts as hereinafter indicated. The casing is secured to a suitable support by means of the arms 15, the ends of which are formed with lateral extensions which are perforated for the passage of bolts or other securing means.

Figure 2:
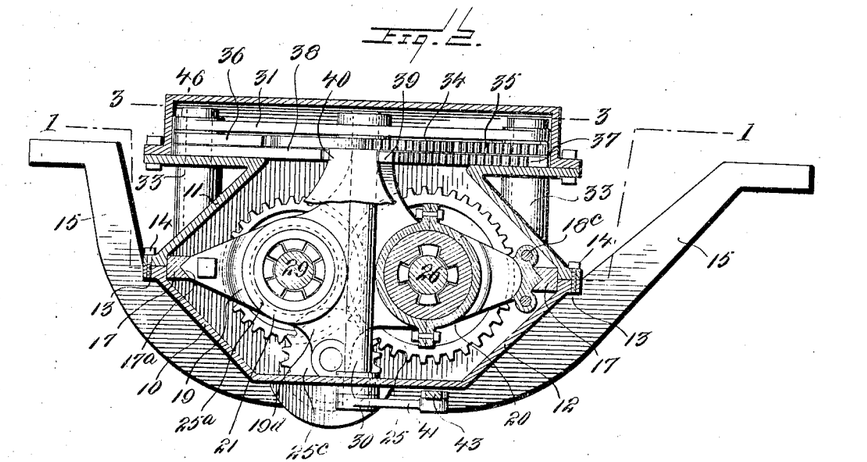
Fig. 2 is a vertical cross-sectional view taken on line 2—2 of Fig. 1.

17, 17, designate two guides mounted within the casing members at their points of juncture (the point of greatest width of the chamber) and extending throughout the length of the casing, each of said guides being formed with a V-shaped groove $17^a$ as shown in Fig. 2. The guides 17, 17 are adapted to receive the gear carriers presently described, and the complemental arrangement of the guides and casing may be such that the members of the casing, when secured together, will position the guides against a vertical movement without the necessity of employing securing means, but it will be understood that, if necessary, I may removably secure the guides to either or both members of the casing in any suitable manner in order that relative movement of the guides and casing will be prevented.

18 and 19 designate the gear carriers, each of which is composed of a plurality of members secured together, said members having tongues formed complementally to the grooves $17^a$. The members of the carriers are preferably formed as a unitary structure.

Figure 1:
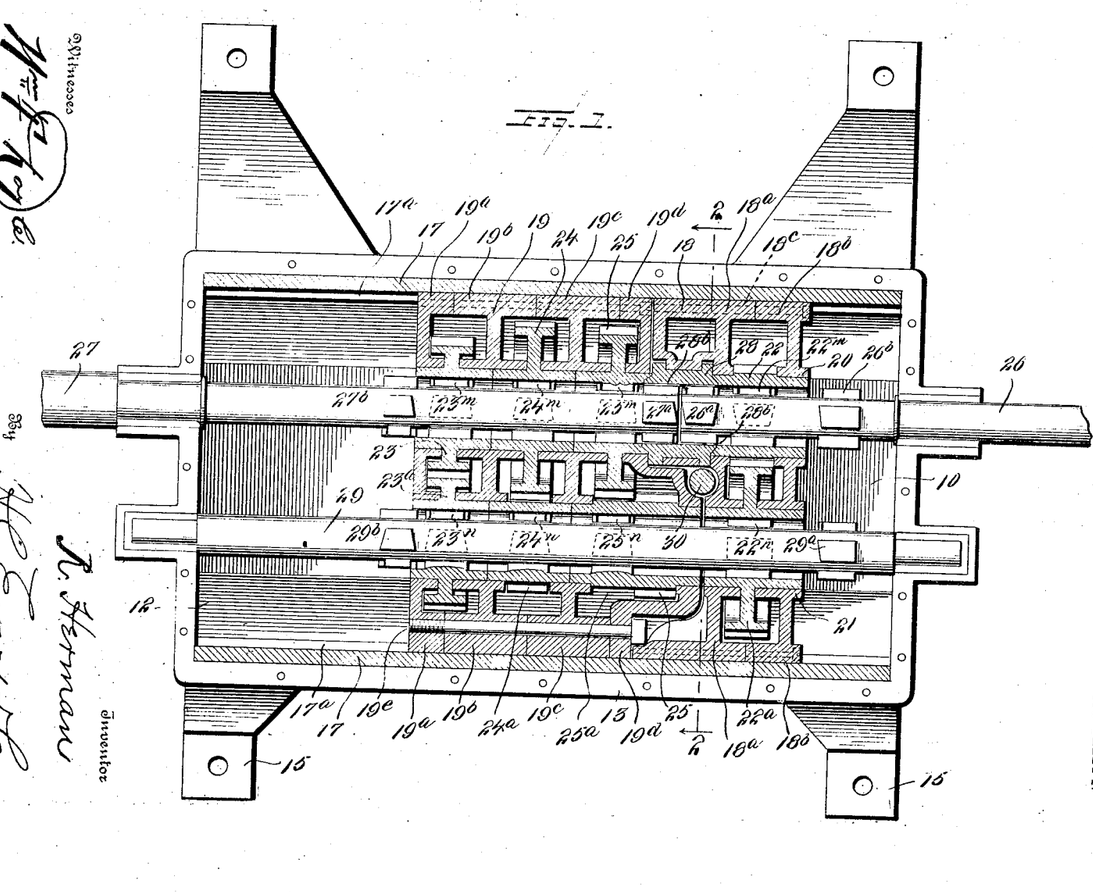
—Figure 1 is a horizontal sectional view taken through the casing on the line 1—1 of Fig. 2.

The members of the carriers 18 and 19 are each formed with bearings 20 and 21 to receive the hubs of the gears, the bearings 20 being for the gears coöperating with the drive or the driven shaft, as hereinafter explained, while the bearings 21 are provided for the gears coöperating with the counter or speed-changing shaft. As shown in Fig. 1, the bearings of the carriers are supported by webs, said bearings extending on opposite sides of the webs, while the tongue-carrying portions of the members are of greater length than the length of the bearings, the construction being such that when the members are secured together the bearings are spaced from each other a distance sufficient to permit of the passage of the webs of the gears, annular spaces being formed around the bearings within which spaces the toothed portions of the gears are located.

For the purpose of distinguishing the members of the carriers, I have designated them in the drawings as $18^a$, and $18^b$, and $19^a$, $19^b$, $19^c$, and $19^d$. The general formation of members $19^b$ and $19^c$ is similar, while that of member $19^a$ differs therefrom only in that it is approximately one-half of the width of the member $19^b$, said member $19^a$ forming one end of the carrier 19. The member $19^d$, as shown in Fig. 1, differs from member $19^c$ in that one side of the member is formed with a laterally-extending portion to provide an increased space between the members $19^c$ and $19^d$ for a purpose presently described, said laterally-extending portion also being lengthened downwardly as indicated in Fig. 2. The member $18^b$ is of the type of the member $19^a$, forming the outer end of the carrier 18, while the member $18^a$ differs from the remaining members in that one side (that on the opposite side of the casing chamber from the laterally-extending portion of member $19^d$) is provided with a laterally-extending portion which forms a bearing for the direct-drive connector hereinafter described, this particular bearing being formed divided, as shown in Fig. 2, to permit of the connector being placed in position. The remaining bearings are preferably formed integral with the members, the manner of assembling the members and gears together permitting such construction.

As will be seen in Fig. 1, the members $18^a$ and $18^b$ are secured together by bolts $18^c$ to form a unitary structure, while the members $19^a$, $19^b$, $19^c$ and $19^d$ are similarly secured together by bolts $19^e$ to form a second unitary structure, the members $18^a$ and $19^d$ being in opposed relation and having their exposed faces complementally formed to permit them to be brought into proximity to each other.

The carriers are completed by the following constructions: The carrier 18 is adapted to carry the coöperating gears 22 and $22^a$, said gears being mounted in bearings 20 and 21, respectively, of the members $18^a$ and $18^b$, and extending into the annular spaces formed around said bearings, the gear 22 being of less diameter than gear $22^a$, said gears being placed in position prior to the securing of the members $18^a$ and $18^b$ together. This carrier is completed by the direct-drive connector heretofore referred to.

The carrier 19 is completed by the coöperating gears 23 and $23^a$, 24 and $24^a$, and gears 25, $25^a$, $25^b$ and pinion $25^c$, the gears 23, 24 and 25 being mounted in the bearings 20 of the carrier members, the gears $23^a$, $24^a$ and $25^a$ being mounted in bearings 21 of said members. The gears 25 and $25^a$ are not geared together but are operatively connected through gear $25^b$ and pinion $25^c$, the latter having their axes in alinement and being suitably mounted to rotate in unison, the gear $25^b$ being geared with gear $25^a$ while the pinion $25^c$ is geared with gear 25. Coöperating or pairs or sets of gears are of such relative diameters as to provide different speeds of rotation of the gears 23 and 24, while gear 25 is given a motion in a direction reverse to that of gears 23 and 24.

The drive shaft 26 and driven shaft 27 are in alinement with each other, the ends of the shafts within the casing chamber extending in close proximity to each other. Each of said shafts is mounted in a bearing formed in the end of the casing through which it extends, and said shafts are positioned within the casing so as to pass centrally through the bearings 20 and the hubs of the gears carried thereby.

The drive shaft 26, adjacent its end, is provided with radially-extending lugs 26ª (preferably four in number) spaced equidistant one from another, and arranged in circumferential alinement on the shaft. Said lugs are preferably provided with inclined faces as shown, and are adapted to coöperate with similarly-positioned lugs 28ª formed on the inner periphery of the direct-drive connector 28, the size of the respective lugs being such as to permit the lugs of one of the elements to enter the spaces between the lugs of the other element. The shaft 26 is also provided with another set of lugs 26ᵇ, said lugs 26ᵇ being positioned as shown in Fig. 1. The lugs 26ᵇ are adapted to coöperate with lugs 22ᵐ formed on the inner periphery of gear 22.

The driven shaft is provided with radially-extending lugs 27ª positioned adjacent the end of the shaft and which are adapted to coöperate with the inwardly-projecting lugs 28ᵇ of the connector 28. Said shaft is also provided with a set of lugs 27ᵇ positioned on the shaft 27 substantially as shown in Fig. 1, said lugs 27ᵇ being adapted to be engaged by the inwardly-extending lugs 23ᵐ, 24ᵐ and 25ᵐ, respectively, of gears 23, 24 and 25, when either of said gears may be brought to a position where its lugs will have a path of movement coincident with that of the lugs 27ᵇ.

29 designates a counter shaft extending from one end of the casing to the other, said shaft extending parallel with the drive and driven shaft and positioned to pass centrally through bearings 21 and the gears carried thereby. Said shaft 29 is provided with radially-extending lugs 29ª and 29ᵇ positioned as shown in Fig. 1, the lugs 29ª being adapted to coöperate with inwardly-projecting lugs 22ⁿ formed on gear 22ª, while the lugs 29ᵇ are adapted to coöperate with the inwardly-extending lugs 23ⁿ, 24ⁿ and 25ⁿ formed, respectively on the gears 23ª, 24ª and 25ª, when any of said gears are brought into position to cause an engagement between the shaft and gear lugs.

The lugs 26ᵇ and 29ª are in approximate alinement, as are lugs 27ᵇ and 29ᵇ in order that the movements of the carriers may be such as to cause engagement of coöperating gears. In actual practice, however, the respective sets of alined lugs are set slightly in advance of each other (about one-sixteenth of an inch) in the following order (the lugs 26ᵇ being considered as the start): 26ᵇ, 29ª, 29ᵇ, and 27ᵇ, the object being that as the carriers are moved to cause engagement of the gears in the manner hereinafter indicated, the lugs will become engaged in succession in the order indicated, thereby providing a successive engagement as the carriers are moved accordingly, the opposite movement of the carriers serving to disengage the lugs in the reverse order.

As indicated in the drawings the shaft and gear lugs have inclined faces, these being provided to insure against end to end locking contact of the lugs.

Figure 3:
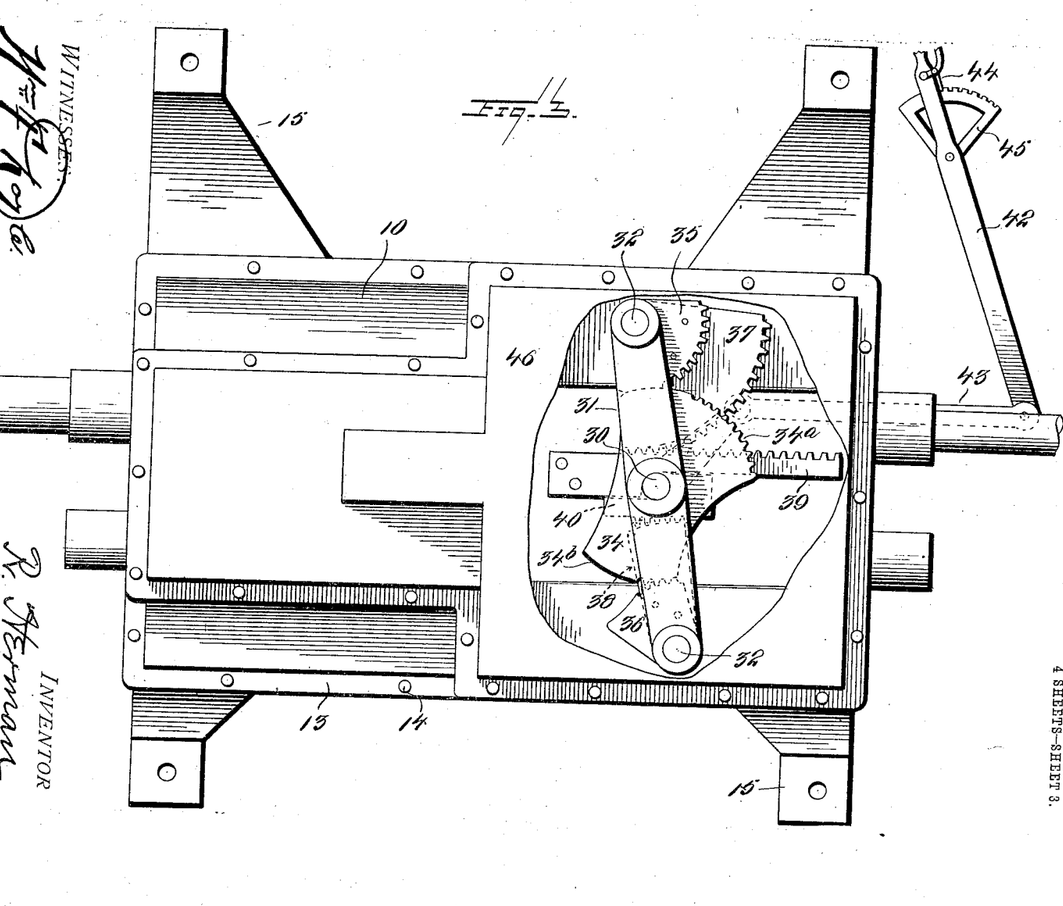
Fig. 3 is a horizontal sectional view taken on line 3—3 of Fig. 2.
Figure 4:
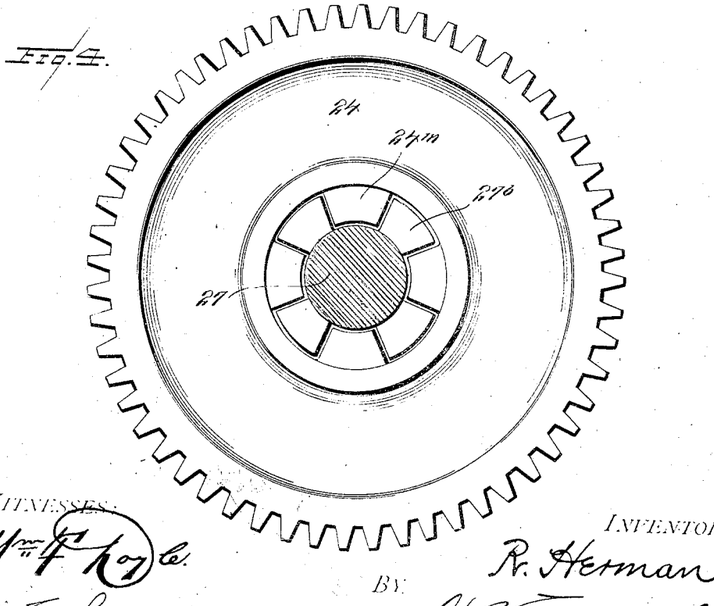
Fig. 4 is a detail sectional view of one of the shafts and showing a gear in operative engagement therewith.
Figure 5:
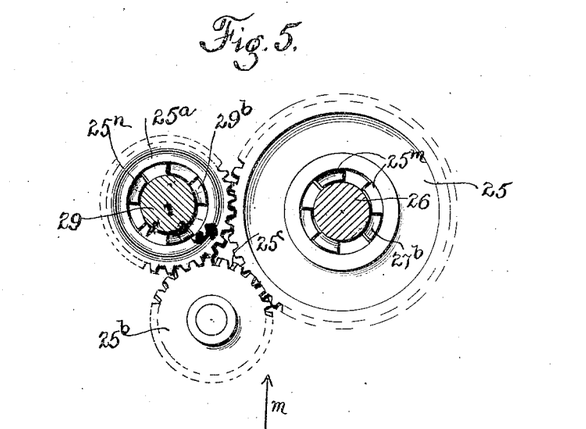
Fig. 5 is an end view, (looking in the direction of the arrow *p* in Fig. 6) of the carrier 19, the carrier frame being omitted, the view illustrating the relative location of the reversing gears.
Figure 6:
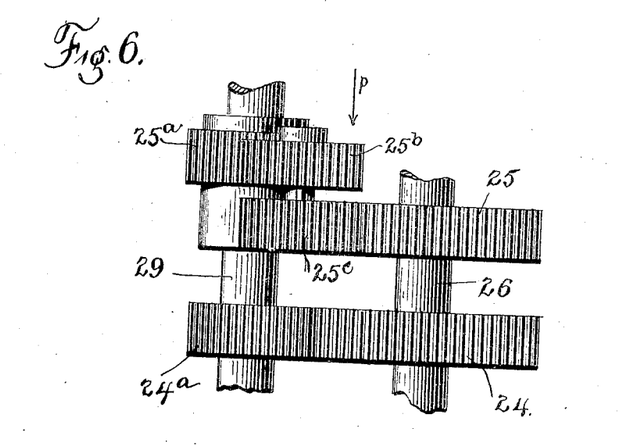
Fig. 6 is a bottom plan view looking in the direction of arrow *m* in Fig. 5.

As shown the gear lugs are of approximately the same length as that of the teeth of the gear on which the lugs are formed and are positioned in substantially radial alinement with the teeth. By this construction the lugs and gear teeth of the respective sets of gears are in alinement so that when operative engagement of the lugs is had the strains will not tend to produce a rocking effect on the gear or an unequal pressure on the bearings of the gears. Furthermore, as shown best in Fig. 3, the periphery of the lugs of the shafts and gears do not extend into contact with the periphery of the opposing element, but is spaced therefrom, so that actual contact of the respective lugs is only had on the sides of the lugs and consequently the only strain placed on the shafts when the gear engagement is had is a torsional one and that is reduced to a minimum owing to the presence of a plurality of lugs and the fact that the shaft is free from all frictional engagement, the gear strains, including those produced by the teeth strains, being borne by the bearings 20 or 21 as the case may be, and as these bearings are formed on the carriers which are in turn supported in the guides 17, it will be understood that such gear stress is practically borne by the carriers and casing and not by the shafts.

By reference to Fig. 1, it will also be seen that the hubs of adjacent gears are of a length as to extend in proximity to each other, but it is to be understood that there is no frictional engagement between such hubs, the carrier members forming spacing devices which fixedly retain the gears against movement axially. It will also be seen that the lugs of the gears are of less length than the length of the hubs, being positioned intermediate the ends of the hubs. By this construction, the bearings for the gears are kept substantially free from sediment, while spaces are formed between successive sets of lugs into which the lugs of the shaft may pass while changing from one speed to another and which may form a neutral zone to stop movement of the driven shaft when at any speed without requiring the manipulation of the gears through different speeds. It will also be understood that only that set of gears which may be in operative engagement with the lugs of the shafts will be driven, the remaining gears being at rest.

As will be readily seen, the drive and driven shafts, when the parts are in the position shown in Fig. 1, are positively connected together by the connector 28, none of the gears being in operation. This is the direct-drive position of the mechanism and provides the high speed. In order that the change of speed and direction of movement of the driven shaft may be had, the carriers must be shifted in their guides, and these movements are provided by the following mechanism: As shown in Fig. 2, 30 designates a vertically-extending shaft mounted in the bottom of the casing member 12 and extending vertically through the casing-chamber to a point above the plane of the top of the casing member 11; as shown in Fig. 1, said shaft is positioned at the point of juncture of the two carriers. The upper end of said shaft 30 is mounted in a bearing formed in a plate or bar 31, the ends of which are fixedly positioned by means of screws or bolts 32 which extend therethrough and into suitable posts 33 carried by the casing. Mounted on the shaft 30 below said plate 31 is a mutilated gear segment 34 having operating edges 34$^a$ and 34$^b$ on diametrically opposite edges, each of said operating edges comprising gear teeth and a smooth face, the number of gear teeth on the edge 34$^a$ being greater than the number on the edge 34$^b$. The operating edge 34$^a$ is adapted to coöperate with the operating edge of a mutilated segment 35 pivotally mounted on one of the screws or bolts 32 the operating edge of said segment 35 having gear teeth and a smooth-face portion which coöperates with the smooth-face portion of the edge 34$^a$ of the segment 34. The operating edge 34$^b$ is adapted to coöperate with the operating edge of a mutilated segment 36 pivotally mounted on the other of said screws or bolts 32 on the opposite side of the casing the operating edge of the segment 36 also having gear teeth and a smooth-face portion to coöperate with the similar portions of the edge 34$^b$. Secured to the segments 35 and 36 in such manner as to move in unison therewith are segments 37 and 38, said latter segments being operatively geared to racks 39 and 40 respectively, the rack 39 being carried by the carrier 19, and rack 40 by the carrier 18. The lower end of the shaft 30 is provided with an arm 41 to which is operatively connected an operating lever 42 by means of a connecting member 43, the lever 42 being provided with a suitable pawl structure 44 adapted to coöperate with the notches of a segment 45. The upper portion of the casing is closed by a suitable removable cover 46 which prevents the access of dust, etc., to the casing chamber.

Presuming the parts to be in the position shown in Fig. 1, in which the high speed connections are presented, the various changes in speed are provided as follows, it being understood that the notches of the segment 45 are sufficient in number to provide for the various changes indicated. With the direct-drive in operation, and the parts in the position shown in Figs. 1 and 3, a movement of the lever 42 forwardly the distance of one notch, causes the shaft 30 to be moved pivotally in its bearings, which movement of the shaft 30 provides a corresponding movement of segment 34. The movement of the latter causes the segment 36 to be moved on its pivot, which movement causes the segment 38 to operate to move the rack 40 in a direction to move the carrier 18 a distance sufficient to disengage the connector 28 from the driven shaft 27, but leaving said connector in connection with the drive shaft through the engagement of lugs 28$^b$ and 26$^a$. This movement, however, is not sufficient to carry the lugs 22$^m$ into engagement with lugs 26$^b$. During this movement of the segment 34, movement will not be imparted to segment 35 owing to the fact that the smooth-face portion of the operating edge 34$^a$ is in contact with the similar face of gear 35, so that movement of the carrier 19 is not had, said carrier being held stationary or locked by reason of the lock produced by the contact of said smooth-face portions. With the parts in this position there is no movement of the driven shaft, the mechanism being in a neutral position. A further movement of the lever 42 the distance of one notch, causes a further movement of the segment 34, which now causes, through the segments 36 and 38, the rack 40 to be moved a distance sufficient for the carrier 18 to be positioned so as to cause engagement of the lugs 22$^m$ and 26$^b$ and disengagement of lugs 28$^b$ and 26$^a$, thereby changing the drive movement from the connector 28 to gear 22, and through gear 22$^a$, to shaft 29 by the engagement of lugs 22$^n$ and 29$^a$. When this point in the movement of segment 34 is reached, the coöperating gear teeth of segments 34 and 36 pass out of engagement, so that further movement of the segments 34 will simply cause the smooth-face portions of the edge 34$^b$ and of the segment 36 to be in contact, thereby forming a lock against further movement of the segment 36, and holding the carrier 18 in fixed position. During this movement of segment 34, the operating edge 34$^a$ is passed to a position where the teeth of that edge engage the teeth of segment 35 which is thereby moved a distance sufficient to cause the rack 39, through segment 37, to move the carrier 19 to a point where the lugs 29$^b$ and 27$^b$ engage respectively with the lugs 23$^n$ and 23$^m$, thereby forming an operative connection of the drive and driven shafts through gears 22, 22$^a$, 23$^a$ and 23, the gears being so arranged to produce the intermediate speed.

When the movement of lever 42 has reached the point where engagement of lugs 26$^b$ and 22$^m$ is had, the rotative movement of shaft 29 is had and continues as long as such lug-engagement is in operation. The further movement of the lever 42 in the same direction does not affect the position of the connection owing to the fact that the carrier 18 has reached its limit of movement outwardly, the segments 34 and 36 being so positioned as to provide a lock, as heretofore pointed out. To discontinue the connection it will be necessary to reverse the movement of lever 42 thereby bringing the toothed portions of segments 34 and 36 again into operative engagement and move the carrier to its neutral position.

When the mechanism is in its intermediate speed position, a further movement of lever 42 one notch will cause the carrier 19 to be moved to a point where disengagement of lugs 23$^m$ and 23$^n$ from lugs 27$^b$ and 29$^b$ occurs, the carrier being positioned in such manner that said lugs 27$^b$ and 29$^b$ will lie in the annular spaces between the lugs of the gears 23 and 24 and 23$^a$ and 24$^a$ respectively, in which position the shaft 29 continues its movement but all gears in carrier 19 are at rest, the driven shaft being free from drive movement, the parts in this position being in neutral position. When the succeeding notch is reached by the lever 42, the carrier 19 will be moved to a position where the lugs 24$^n$ and 24$^m$ engage respectively with the lugs 29$^b$ and 27$^b$, which, by reason of the relative sizes of the gears, produces the slow speed. The next movement of the lever 42 brings the carrier to a neutral position beyond the low speed position, and the movement of the lever 42 to the succeeding or final notch causes an engagement of the lugs 25$^n$ and 25$^m$ with the lugs 29$^b$ and 27$^b$ respectively. When this engagement takes place the direction of motion of the driven shaft 27 is changed, owing to the fact that the operative connection between shafts 29 and 27 is through gears 25$^a$ and 25$^b$, pinion 25$^c$ and gear 25. A reverse movement of lever 42 from the position last indicated exactly reverses the operation just described, the carrier 19 being moved to successively bring the low and intermediate speeds into operation without affecting the position of the carrier 18, the succeeding movement causing carrier 19 to be moved to its inoperative position and carrier 18 to its neutral position from which further movement of said lever 42 provides the direct-drive connection heretofore indicated.

As will be obvious, the movements of the carriers may be rapid or slow as desired, the form of connection of shafts and gears being such that free movement is had when the lever 42 is manipulated.

By reason of the construction shown, it will be seen that the carriers move in opposite directions the length of movement being controlled by the distance between the outermost gears.

Among the advantages resulting from the construction described, are the following:— The casing is of a minimum size and of a form readily lending itself to the prevention of the entrance of dust. The arrangement of parts is such that the casing can be readily separated, the shafts removed without disturbing the relative gear arrangement, or the carriers may be removed as a unit; in addition, the carriers themselves can be readily segregated into its gears and members, so that cleaning, assembling or repairing can be readily done. The only gears in motion when the driven shaft is being operated are those connecting the counter shaft with the drive and driven shafts the remainder of the gears remaining stationary. The driving points on the shafts are fixed and unvaried excepting when changing to or from the direct drive. The stress of each set of gears is borne by a fixed and supported portion (the carrier) and is not communicated to the shafts, thereby not only prolonging the life of the gears but also preventing crystallization of the shafts, and by reason of the particular arrangement, the structure is practically noiseless, the fact that the gears are positively held against relative lateral movement aiding in this result.

In the present case I have disclosed a device in which two carriers are employed, the carriers being adapted to move in opposite directions. I do not limit myself to this particular arrangement of carriers, since a somewhat similar result may be obtained by the use of a single carrier, a construction which I have shown and described in my application filed May 27, 1908, Serial No. 435,231.

While I have shown and described herein a preferred form of my invention, it is to be understood that variations in the form arrangement and operation of the parts may be made, and I reserve the right to make such changes as may be desirable to carry out the objects of my invention, in so far as such changes may fall within the spirit and scope of my invention as expressed in the accompanying claims.

Having now described my invention, what I claim as new is:

1. Power transmitting mechanism comprising a drive and a driven shaft mounted in alinement, a counter shaft extending in parallelism with said shafts, and drive connections from the drive to the driven shaft and coöperating with the counter shaft, said connections including permanently-engaged coöperating gears and being movable in directions longitudinally of the shafts.

2. Power transmitting mechanism comprising a drive shaft and a driven shaft mounted in alinement, a counter shaft extending in parallelism with said shafts, a direct-drive connection between the drive and driven shafts, said connection being movable longitudinally of the drive and driven shafts, and drive connections between the drive and driven shafts and coöperating with the counter shaft, said latter connections including permanently-engaged coöperating gears and being movable longitudinally of said shafts.

3. Power transmitting mechanism comprising a drive shaft and a driven shaft mounted in alinement, a counter shaft extending in parallelism with said shafts, and drive connections from the drive to the driven shaft and coöperating with the counter shaft, said connections being movable in directions longitudinally of the shafts, the connections between the counter and driven shafts being movable as a unitary structure.

4. Power transmitting mechanism comprising a drive shaft and a driven shaft mounted in alinement, a direct drive connection between said shafts and movable longitudinally of said shafts, a counter shaft extending in parallelism with said shafts, a drive connection between the drive and counter shafts, said connection being movable longitudinally of said shafts and mounted to move in unison with the direct drive connection during the longitudinal movement of the latter, and drive connections between the counter and driven shafts, said connections forming a speed-changing structure for the driven shaft and being movable longitudinally of said shafts as a unitary structure.

5. In power transmitting mechanisms, a casing, a drive shaft and a driven shaft extending into said casing and mounted in alinement with each other, a counter shaft carried by said casing and extending in parallelism with said shafts, gear-carrying mechanism mounted within said casing and movable longitudinally thereof, said mechanism having gear bearings, gears mounted within said bearings, and means for controllably moving said carrying mechanism to drive the driven shaft through the counter shaft.

6. In power transmitting mechanism, a casing, a drive shaft and a driven shaft extending into said casing and mounted in alinement with each other, a counter shaft carried by said casing and extending in parallelism with said shafts, gear-carriers mounted within said casing and movable longitudinally thereof, said carriers having gear-bearings, gears mounted within said bearings, said gears being arranged in operating pairs, said gears being formed with central openings for the free passage of the shafts therethrough, and coöperating means carried by the shafts and gears for operatively connecting the drive and driven shafts when the carriers are moved to predetermined positions.

7. In power transmitting mechanism, a drive shaft and a driven shaft mounted in alinement, a counter shaft, gear carriers movable in directions longitudinally of the shafts, the shafts extending into and through the carriers, bearings for gears formed in said carriers, gears mounted in said bearings externally of the shafts, coöperating lugs carried by the shafts and gears for operatively connecting the drive and driven shafts when the carriers are moved to predetermined positions, and means for adjustably moving said carriers.

8. In power transmitting mechanism, a drive shaft, a driven shaft, means for operatively connecting said shafts to provide a direct drive therebetween, a counter-shaft, and independent means for operatively connecting the drive and driven shafts, said latter means coöperating with the counter shaft, said means and independent means being brought into and out of operative engagement by a movement thereof longitudinally of the shafts.

9. In power transmitting mechanism, a drive shaft, a driven shaft, means for operatively connecting said shafts to provide a direct drive therebetween, a counter-shaft, independent means for operatively connecting the drive and driven shafts, said latter means coöperating with the counter shaft, said independent means permitting an adjustment of the driven shaft to varying speeds, the operative engagement of the independent means and the driven shaft being confined to a single circumferential plane.

10. In power transmitting mechanism, the combination with a drive shaft, a driven shaft, and a counter-shaft, said shafts being held against longitudinal movements, means for operatively connecting the drive and counter-shafts, of gear mechanism for operatively connecting the counter and driven shafts to provide varying speeds of the driven shaft, said mechanism being normally free from contact with said shafts, and means for bringing said mechanism into position to make operative contact with the shafts.

11. In power transmitting mechanism, the combination with a drive shaft, a driven shaft, and a counter shaft adapted to be driven from the drive shaft, said shafts being held against longitudinal movement of gear mechanism for operatively connecting the counter and driven shafts to provide varying speeds for the driven shaft, and means for bringing said mechanism into position to make operative contact with the shafts, said contact being substantially simultaneous in both shafts.

12. In power transmitting mechanism, the combination with a drive shaft, a driven shaft, and a counter shaft adapted to be driven from the drive shaft, said shafts being held against longitudinal movement of gear mechanism for operatively connecting the counter and driven shafts, said mechanism being normally free from contact with said shafts, and means for moving said mechanism into position to make operative contact with the shafts, said positioning movement being in directions longitudinally of the shafts.

13. In power transmitting mechanism, the combination with a drive shaft, a driven shaft, and a counter shaft adapted to be driven from the drive shaft, said shafts being held against longitudinal movement of gear mechanism for operatively connecting the counter and driven shafts, said mechanism being normally free from contact with said shafts, and means for moving said mechanism into position to make operative contact with the shafts, said positioning movement being in directions longitudinally of the shafts, the operative contact being substantially simultaneous in both shafts.

14. In power transmitting mechanism, the combination with a drive shaft, a driven shaft, and a counter-shaft, of a carrier movable longitudinally of the shafts, means supported by the carrier for operatively connecting said drive and driven shafts, and independent means also supported by said carrier for operatively connecting the drive and counter-shafts, said means and independent means being normally free from contact with the shafts, the movements of said carrier positioning said means or independent means to make operative contact with the shafts, each of said shafts having devices adapted to coöperate with said means or independent means when the latter are in proper relationship therewith.

15. In power transmitting mechanism, the combination with a drive shaft, a driven shaft, and a counter shaft, of a carrier movable longitudinally of the drive and counter shafts, means supported by the carrier for operatively connecting the drive and driven shafts direct, independent means also supported by the carrier for operatively connecting the drive and counter shafts, each of said shafts having devices adapted to coöperate with said means or independent means when the latter are in proper relationship therewith, said connections being arranged to prevent simultaneous operation of said means and independent means, and an independent carrier, and supplemental means carried by the independent carrier and the driven and counter shafts for operatively connecting said shafts, said carriers being movable longitudinally of the shafts to position the connecting means.

16. In power transmitting mechanism, the combination with a drive shaft, a driven shaft, and a counter shaft, of a carrier movable longitudinally of the drive and counter shafts, means supported by the carrier for operatively connecting the drive and driven shafts direct, independent means also supported by the carrier for operatively connecting the drive and counter shafts, each of said shafts having devices adapted to coöperate with said means or independent means when the latter are in proper relationship therewith, said connections being arranged to prevent simultaneous operation of said means and independent means, and an independent carrier, and supplemental means carried by the independent carrier and the driven and counter shafts for operatively connecting said shafts, said carriers being movable longitudinally of the shafts to position the connecting means, the movements of the carriers being successive with respect to each other.

17. The combination with separated shafts, of gear mechanism for operatively connecting the shafts, said mechanism being positioned concentrically of the shafts and normally free from contact therewith, and coöperating means carried by the mechanism and shafts for forming an operative contact therebetween when said mechanism is moved to a predetermined position relative to the shafts.

18. The combination with separated shafts, of gear mechanism for operatively connecting the shafts, said mechanism being positioned with the gears mounted concentrically of the shafts and normally free from contact therewith, and radially-extending lugs carried by the shafts and gears, for forming an operative contact therebetween when said mechanism is moved to a predetermined position relative to the shafts.

19. The combination with separated shafts, of a carrier movable longitudinally of the shafts, bearings formed in said carrier, gears mounted in said bearings, said gears being positioned concentrically of the shaft and normally free from contact therewith, and radially-extending lugs carried by the shafts and gears for forming an operative contact therebetween when the carrier is moved to a predetermined position relative to the shafts.

20. The combination with parallel shafts, of coöperating gears mounted concentrically of said shafts and normally free from contact therewith, each of said gears having a hub of greater length than the length of the teeth of the gear, external bearings for said hubs, and radially-extending lugs fixedly carried by the shafts and gears and adapted to form an operative contact when positioned in circumferential alinement on the shafts, said gear lugs being of a length approximate that of the teeth of the gear.

21. The combination with parallel shafts, of coöperating gears mounted concentrically of said shafts and normally free from contact therewith, each of said gears having a hub of greater length than the length of the teeth of the gear, external bearings for said hubs, and radially-extending lugs fixedly carried by the shafts and gears and adapted to form an operative contact when positioned in circumferential alinement on the shafts, said gear lugs being of a length approximate that of the teeth of the gear and positioned in substantial radial alinement with said teeth.

22. The combination with a shaft, of a gear mounted concentrically thereof and normally free from contact therewith, said gear having a hub of greater length than the length of the teeth of the gear, external bearings for said hub, and radially-extending lugs fixedly carried by the shaft and gear and adapted to form an operative contact when positioned in circumferential alinement on the shaft, said contact being limited to the sides of the lugs.

23. The combination with a shaft, of a gear mounted concentrically thereof and normally free from contact therewith, said gear having a hub of greater length than the length of the teeth of the gear, external bearings for said hub, and radially-extending lugs fixedly carried by the shaft and gear and adapted to form an operative contact when positioned in circumferential alinement on the shaft, said gear lugs being of a length approximate that of the teeth of the gear and positioned in substantial radial alinement therewith.

24. The combination with parallel shafts, of gears mounted concentrically of said shafts and normally free from contact therewith, the gears of the shafts being in coöperating relationship, means independent of and located out of contact with the shafts for supporting the gears, and radially-extending lugs fixedly carried by the shafts and gears and adapted to form an operative contact when positioned in circumferential alinement on the shafts.

25. The combination with parallel shafts, of gears mounted concentrically of said shafts and normally free from contact therewith, the gears of the shafts being in coöperating relationship, means independent of and located out of contact with the shafts for supporting the gears, and radially-extending lugs fixedly carried by the shafts and gears and adapted to form an operative contact when positioned in circumferential alinement on the shafts, the lugs of either member being free from contact with the opposing member.

26. The combination with parallel shafts, of gears mounted concentrically of said shafts and normally free from contact therewith, the gears of the shafts being in coöperating relationship, means independent of and located out of contact with the shafts for supporting the gears, and radially-extending lugs fixedly carried by the shafts and gears and adapted to form an operative contact when positioned in circumferential alinement on the shafts, the lugs of the gears being dissimilar in shape from the lugs of the shafts.

27. The combination with parallel shafts, of gears mounted concentrically of said shafts and normally free from contact therewith, the gears of the shafts being in coöperating relationship, means independent of and located out of contact with the shafts for supporting the gears, and radially-extending lugs fixedly carried by the shafts and gears and adapted to form an operative contact when positioned in circumferential alinement on the shafts, the lugs of either member being free from contact with the opposing member and of a size to substantially fill the space between the opposing peripheries of gear and shaft.

28. The combination with parallel shafts, of gears mounted concentrically of said shafts and normally free from contact therewith, the gears of the shafts being in coöperating relationship, means independent of and located out of contact with the shafts for supporting the gears, and radially-extending lugs fixedly carried by the shafts and gears and adapted to form an operative contact when positioned in circumferential alinement on the shafts, said lugs having a radial length slightly less than the radial distance between the periphery of the shaft and the inner periphery of the gears.

29. The combination with parallel shafts, of gears mounted concentrically of said shafts and normally free from contact therewith, the gears of the shafts being in coöperating relationship, means independent of and located out of contact with the shafts for supporting the gears, and radially-extending lugs fixedly carried by the shafts and gears and adapted to form an operative contact when positioned in circumferential alinement on the shafts, the lugs of the shaft being enlarged radially and the lugs of the gears being reduced radially from the peripheries of the members from which they project.

30. The combination with parallel shafts, of gears mounted concentrically of said shafts and normally free from contact therewith, the gears of the shafts being in coöperating relationship, means independent of and located out of contact with the shafts for supporting the gears, and radially-extending lugs fixedly carried by the shafts and gears and adapted to form an operative contact when positioned in circumferential alinement on the shafts, said lugs having a radial length slightly less than the radial distance between the periphery of the shaft and the inner periphery of the gears, the lugs of the shaft being enlarged radially and the lugs of the gears being reduced radially from the peripheries of the members from which they project.

31. The combination with a casing having guides, and shafts extending longitudinally of the casing intermediate and parallel with the guides, of a gear carrier mounted on said guides, gears supported by the carrier mounted concentrically of the shafts, the gears of one shaft being in constant coöperative engagement with the gears of the parallel shaft, and engageable means carried by the gears and shaft for providing a drive connection therebetween when said carrier is at predetermined points on the guides.

32. The combination with a casing having guides, and shafts extending longitudinally of the casing intermediate and parallel with the guides, of a gear carrier mounted on said guides, gears supported by the carrier mounted concentrically of the shafts, the gears of one shaft being in constant coöperative engagement with the gears of the parallel shaft, and engageable means carried by the gears and shaft for providing a drive connection therebetween when said carrier is at predetermined points on the guides, and means for moving said carrier longitudinally of the shafts.

33. The combination with a casing having guides, and shafts extending longitudinally of the casing intermediate and parallel with the guides, of a gear carrier mounted on said guides, gears supported by the carrier, said carrier being formed of a plurality of alined sections removably secured together and combinedly providing recesses and bearings for said gears, the latter being mounted concentrically of the shafts, the gears of one shaft being in constant coöperative engagement with the gears of the parallel shaft, and engageable means carried by the gears and shaft for providing a drive connection therebetween when said carrier is at predetermined points on the guides.

34. In power transmitting and speed-changing mechanism, the combination of a drive shaft, a driven shaft, a counter-shaft, and gear mechanism for and movable longitudinally of said shafts, said mechanisms being adapted to establish operative connection between the shafts at predetermined points in the movement of the mechanisms, and means for imparting longitudinal movements to said mechanisms.

35. In power transmitting and speed-changing mechanism, the combination with a drive shaft, a driven shaft, and a counter-shaft, of a gear mechanism for the drive shaft, a gear mechanism for the driven shaft, each of said mechanisms having an operative relationship with the counter-shaft, and each movable in directions longitudinally of its shafts, said mechanisms being adapted to establish operative connection between the shafts at predetermined points in the movement of the mechanisms, the coöperating gears of each mechanism being in constant engagement, and means for imparting longitudinal movements to said mechanisms.

36. In power transmitting and speed-changing mechanism, the combination with a drive shaft, a driven shaft, and a counter-shaft, of a gear mechanism for the drive shaft, a gear mechanism for the driven shaft, each of said mechanisms having an operative relationship with the counter-shaft, each being movable in directions longitudinally of its shafts, said mechanism being adapted to establish operative connection between the shafts at predetermined points in the movement of the mechanisms, the coöperating gears of each mechanism being in constant engagement, and means for imparting successive longitudinal movements to said mechanisms.

37. In power transmitting and speed-changing mechanism, the combination with a drive shaft, a driven shaft, and a counter-shaft, of a gear mechanism for the drive shaft, a gear mechanism for the driven shaft, each of said mechanisms having an operative relationship with the counter-shaft, and each being movable in directions longitudinally of its shafts, said mechanism being adapted to establish operative connection between the shafts at predetermined points in the movement of the mechanisms, the coöperating gears of each mechanism being in constant engagement, and means for imparting longitudinal movements to said mechanisms, the longitudinal movements of one mechanism being intermediate similar movements of the other mechanism from and to a point of fixed position of the latter mechanism.

38. In power transmitting and speed-changing mechanism, the combination with a drive shaft, a driven shaft, and a counter-shaft, of a gear mechanism for the drive shaft, a gear mechanism for the driven shaft, each of said mechanisms having an operative relationship with the counter-shaft, and each movable in directions longitudinally of its shafts, said mechanisms being adapted to establish operative connection between the shafts at predetermined points in the movement of the mechanisms, the coöperating gears of each mechanism being in constant engagement, and means for imparting longitudinal movements to said mechanisms, the longitudinal movements of the driven shaft mechanism being intermediate similar movements of the drive shaft mechanism from and to a position of direct connection with the driven shaft.

39. In power transmitting and speed-changing mechanism, the combination with a drive shaft, a driven shaft, and a counter-shaft, of a gear mechanism for the drive shaft, a gear mechanism for the driven shaft, each of said mechanisms having an operative relationship with the counter-shaft, and each being movable in directions longitudinally of its shafts, said mechanisms being adapted to establish operative connection between the shafts at predetermined points in the movement of the mechanisms, the coöperating gears of each mechanism being in constant engagement, and means common to both mechanisms for imparting longitudinal movements thereto.

40. In power transmitting and speed-changing mechanisms, the combination with a drive shaft, a driven shaft, and a counter-shaft, of a gear mechanism for the drive shaft, a gear mechanism for the driven shaft, each of said mechanisms having an operative relationship with the counter-shaft, and each being movable in directions longitudinally of its shafts, said mechanisms being adapted to establish operative connection between the shafts at predetermined points in the movement of the mechanisms, the coöperating gears of each mechanism being in constant engagement, and means common to both mechanisms for imparting longitudinal movements thereto, the longitudinal movements of the driven shaft mechanism being intermediate similar movements of the drive shaft mechanism from and to a position of direct connection with the driven shafts.

41. In power transmitting and speed-changing mechanism, the combination with a drive shaft, a driven shaft, and a counter-shaft, of a gear mechanism for the drive shaft, a gear mechanism for the driven shaft, each of said mechanisms having an operative relationship with the counter-shaft, and each being movable in directions longitudinally of its shafts, said mechanisms being adapted to establish operative connection between the shafts at predetermined points in the movement of the mechanisms, the coöperating gears of each mechanism being in constant engagement, and means common to both mechanisms for imparting longitudinal movements thereto, the longitudinal movements of the driven shaft mechanism being intermediate similar movements of the drive shaft mechanism from and to a position of direct connection with the driven shaft, one mechanism being normally locked against movement during movements of the other mechanism.

42. In power transmitting and speed-changing mechanism, the combination with a drive shaft, a driven shaft, and a counter-shaft, of a gear mechanism for the drive shaft, a gear mechanism for the driven shaft, each of said mechanisms having an operative relationship with the counter-shaft, and each being movable in directions longitudinally of its shafts, said mechanisms being adapted to establish operative connection between the shafts at predetermined points in the movement of the mechanisms, the coöperating gears of each mechanism being in constant engagement, and means for imparting longitudinal movements to said mechanisms, the longitudinal movements of one mechanism being intermediate similar movements of the other mechanism from and to a position of direct connection with the driven shaft, the longitudinal movement of one mechanism in succession to the longitudinal movement of the other mechanism being in an opposite direction.

43. In power transmitting and speed-changing mechanism, the combination with alined drive and driven shafts, and a counter-shaft in parallelism therewith, of a gear carrier having gears adapted to coöperate with the drive and counter-shafts, a gear carrier having gears coöperating with the driven and counter-shafts, said gear carriers being movable longitudinally of the shafts, and means for imparting longitudinal movements to the gear carriers.

44. In power transmitting and speed-changing mechanism, the combination with alined drive and driven shafts, and a counter-shaft in parallelism therewith, of a gear carrier, gears carried thereby and adapted to coöperate with the drive and counter-shafts, a second gear carrier, gears carried by said second gear carrier and coöperating with the driven and counter-shafts, said gear carriers being movable longitudinally of the shafts, and means for imparting longitudinal movements to the gear carriers, said means comprising actuating devices for each carrier, and a movable device coöperating with said actuating devices for imparting movement thereto at predetermined points in the movement of the device.

45. In power transmitting and speed-changing mechanism, the combination with alined drive and driven shafts, and a counter-shaft in parallelism therewith, of a gear carrier, gears carried thereby and adapted to coöperate with the drive and counter-shafts, a second gear carrier, gears carried by said second gear carrier and gears coöperating with the driven and counter-shafts, said gear carriers being movable longitudinally of the shafts, and means for imparting longitudinal movements to the gear carriers, said means comprising actuating devices for each carrier, and a movable device coöperating with said actuating devices for imparting movement thereto at predetermined points in the movement of the device, said devices forming locking mechanism for the carriers when moved into predetermined positions.

46. In power transmitting and speed-changing mechanism, the combination with alined drive and driven shafts, and a counter-shaft in parallelism therewith, of a gear carrier, gears carried thereby and adapted to coöperate with the drive and counter-shafts, a second gear carrier, gears carried by said second gear carrier and coöperating with the driven and counter-shafts, said gear carriers being movable longitudinally of the shafts, and means for imparting longitudinal movements to the gear carriers, said means comprising a gear segment for each carrier, said segments being spaced apart and having independent axes, a three-member gear mechanism for operating said segments, each segment having a member axially alined therewith, and means for moving the third member pivotally.

47. In power transmitting and speed-changing mechanism, the combination with alined drive and driven shafts, and a counter-shaft in parallelism therewith, of a gear carrier, gears carried thereby and adapted to coöperate with the drive and counter-shafts, a second gear carrier, gears carried by said second gear carrier and coöperating with the driven and counter-shafts, said gear carriers being movable longitudinally of the shafts, and means for imparting longitudinal movements to the gear carriers, said means comprising a gear segment for each carrier, said segments being spaced apart and having independent axes, a three-member mutilated gear mechanism for operating said segments, each segment having a member axially alined therewith, and means for moving the third member pivotally.

48. In power transmitting and speed-changing mechanism, the combination with alined drive and driven shafts, and a counter-shaft in parallelism therewith, of a gear carrier, gears carried thereby and adapted to coöperate with the drive and counter-shafts, a second gear carrier, gears carried by said second gear carrier and coöperating with the driven and counter-shafts, said gear carriers being movable longitudinally of the shafts, and means for imparting longitudinal movements to the gear carriers, said means comprising a pair of axially-alined gear segments for each carrier, the axes for the pairs of segments being parallel, one segment of each pair of segments having a mutilated operating face, a mutilated gear mounted between and coöperating with the mutilated segments, and means for moving said mutilated gear pivotally.

49. In power transmitting and speed-changing mechanism, the combination with a drive and a driven shaft mounted in alinement, and a counter-shaft, of means coöperating with the counter-shaft for operatively connecting the drive and driven shafts during movements longitudinally of the shafts and at predetermined points within the limits of such longitudinal movements, the points on the drive and driven shaft at which operative connection is made being the same with each change of speed provided through the counter-shaft.

In testimony whereof I affix my signature in the presence of two witnesses.

REINHOLD HERMAN.

Witnesses:
GILMORE HERMAN,
ERNEST PAYNE.